July 29, 1924.

A. J. LAVOIE 1,502,727

TRANSMISSION JOINT AND SHOCK ABSORBER

Filed Jan. 4, 1922      2 Sheets-Sheet 1

INVENTOR
A. J. Lavoie
BY E. J. Fathurstonhough
ATTORNEY

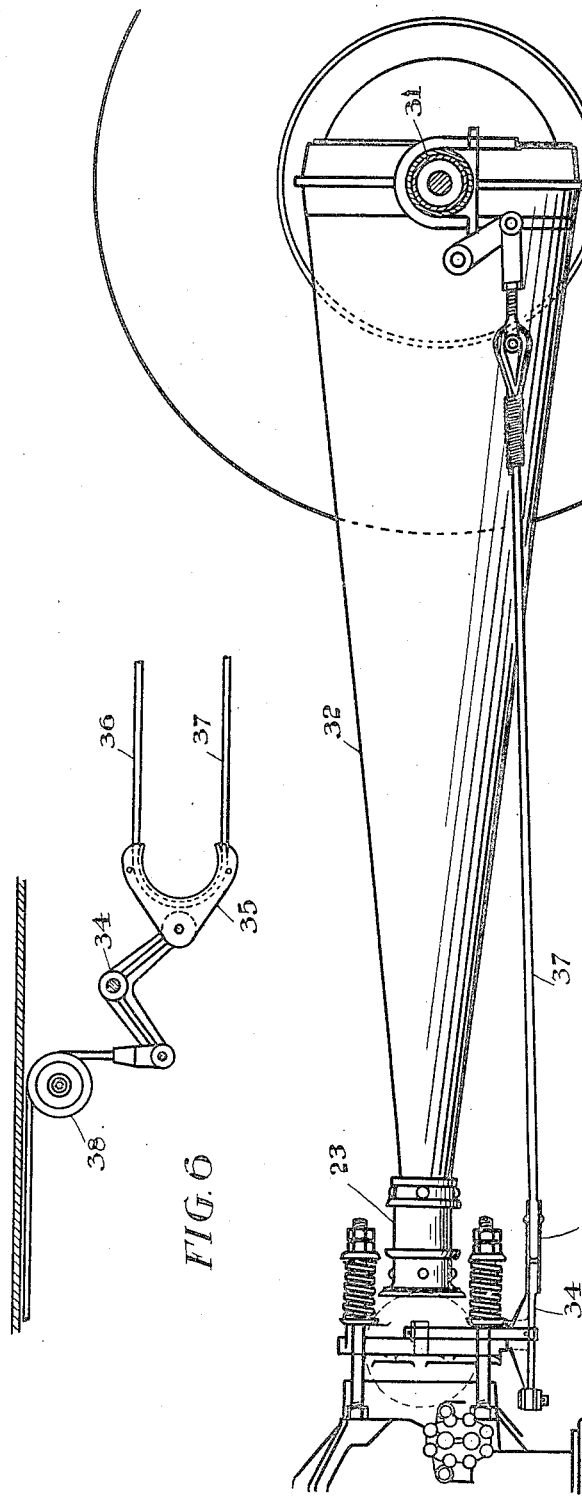

Patented July 29, 1924.

1,502,727

UNITED STATES PATENT OFFICE.

ALPHONSE JOSEPH LAVOIE, OF MONTREAL, QUEBEC, CANADA.

TRANSMISSION JOINT AND SHOCK ABSORBER.

Application filed January 4, 1922. Serial No. 526,956.

*To all whom it may concern:*

Be it known that I, ALPHONSE JOSEPH LAVOIE, a subject of the King of Great Britain, and residing at the city of Montreal, in the Province of Quebec, in the Dominion of Canada, have invented a new and useful Transmission Joint and Shock Absorber, of which the following is the specification.

The invention relates to transmission joint and shock absorber as described in the present specification and illustrated in the accompanying drawings that form part of the same.

The invention consists essentially of the novel features of construction pointed out broadly and specifically in the claims for novelty following a description in detail of the preferred form of the invention.

The objects of the invention are to insure flexibility and thereby avoid dislocation of the parts in transmitting the power from the engine to the axle; to absorb the shock of a sudden horizontal movement following a jar or jolt; and generally to provide a durable and efficient connection from the power to the driven members.

In the drawing, Figure 1 is a longitudinal sectional view of the joint and shock absorber.

Figure 5 is a side elevation of the torsion tube and connections.

Figure 6 is a plan view of the brake operating connections.

Like numerals of reference indicate corresponding parts in the various figures.

Figure 1:
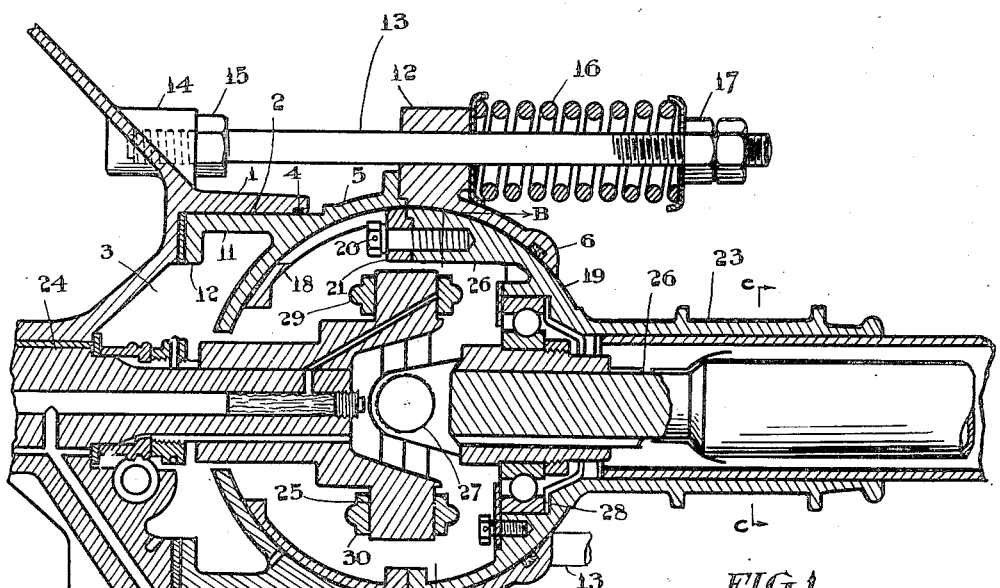
Figure 2:
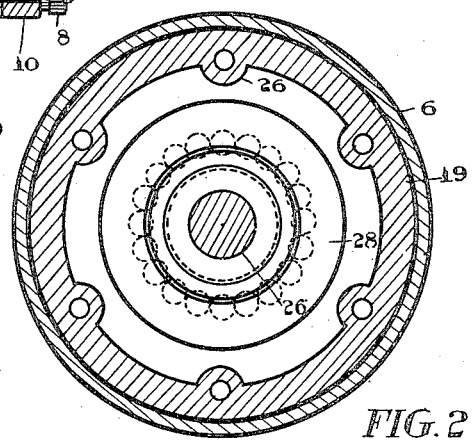
Figure 2 is a cross sectional view of the universal joint on the line B—B in Figure 1.
Figure 4:
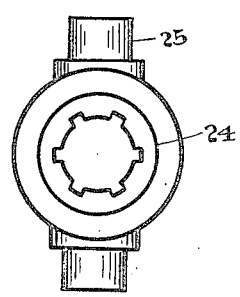
Figure 4 is an end view of a knuckle member.
Figure 3:
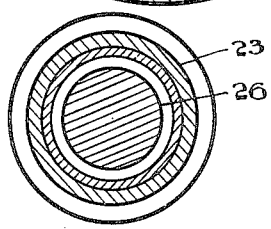
Figure 3 is a cross sectional view on the line C—C in Figure 1.

Referring to the drawing, the transmission case 1 terminates in a cylindrical socket 2 surrounding the shaft orifice 3 and having the packing ring 4 in the bed of said socket.

The ball casing is divided into inner and outer halves 5 and 6 joined by the bolts 7 and nuts 8 through the flanges 9 and 10 respectively.

The inner half 5 is formed with the intermediate plunger extension 11 reciprocating in the socket 2 and having the inward annular flange 12 meeting the packing ring 4.

The outer half 6 is formed with the bosses 12 having holes for the rods 13, which are secured into the bosses 14 from the case 1 and held therein by the jam nuts 15.

The rods 13 project beyond the bosses 12 and are encircled by the springs 16 between the nuts 17 and said bosses 12 therefore these springs 16 hold the ball casing in the socket 2 except under circumstances of stress and strain.

The ball is also formed of inner and outer shell halves 18 and 19 held together by the screws 20 through the bosses 21 and 22 respectively, the outer half 19 terminating in the sleeve 23 extending beyond the ball casing.

The power shaft 24 extends into the interior of the ball and carries therein the knuckle member 25 splined thereon and from the other end the transmission shaft 26 is splined in the knuckle member 27 journalled in the ball bearings 28 within the ball.

The knuckle members 25 and 27 are joined by the coupling members 29 and 30 bolted together.

The transmission shaft 26 extends through the sleeve 23 to the gear casing at the rear axle 31 and the latter is joined to the sleeve 23 by the flaring torsion tube 32 forming a positive connection between ball casing and axle so that the horizontal movement of the latter is transmitted directly to the ball casing which is resiliently held in the socket 2, therefore relieving the rigidity of the connection.

In the operation of the invention, the power transmitted through the power shaft 24 is carried through the knuckle joint within the ball and further transmitted to the operating gears through the transmission shaft, within the torsion tube which is well known in practice and readily accomplished.

The torsion tube naturally requires great flexibility in its connections and as it is free to rotate on the rear axle, so is it free every way at its front end by means of the universal connection through the ball joint and the plunger and socket spring mounting of said joint in the transmission case for no matter in what position the rear axle may be placed, its movements will be accommodated one way or the other by this flexible connection.

In assembling and for repair and replacement purposes the splitting of the ball joint parts must be especially emphasized herein as it insures accessibility and reduces the cost of maintenance as well as obtaining great efficiency.

The ball joint reciprocally arranged in the socket 2 carries with a shaft 33 and bell crank lever 34 on said shaft. One section of the bell crank lever 34 is pivotally secured to the equalizer 35 connected to the brakes by the cable 36 and the other section is pivotally connected by the cable 37 over the pulley 38 to the hand operating mechanism.

What I claim is:

1. In a device of the class described, a ball casing and a socket therefor, a compression member holding said casing to said socket, a ball member in said casing and a torsion tube forming the connecting piece from said ball member.

2. In a device of the class described, a ball, ball casing and socket, a compression member resiliently holding said ball casing to said socket, and a torsion tube rigidly mounted on a rear axle and tapering therefrom and joined to said ball.

3. In a device of the class described, a ball formed of two parts, the outer part extending into a sleeve and the inner part being held by integral screws to said outer part and a ball casing in two parts bolted together, the inner part having a plunger extension into a corresponding socket and the outer part having bosses and guide rods and springs resiliently holding said plunger extension in said socket.

4. In a device of the class described, a ball formed of two shell parts having internal bosses and screws holding the parts together, a ball casing in two parts enclosing said ball and bolted together through exterior flanges, a transmission case having a socket, a plunger in said socket extending from said ball casing, a power shaft, a transmission, a knuckle joint connecting said shafts in the interior of said ball and a compression member holding said plunger in said socket.

5. In a device of the class described, a ball formed of two shell parts fastened together, a ball casing in two parts bolted together and having an intermediate plunger extension from outer part, a transmission case having a plunger socket, rods in said lugs and screw threaded into said case, compression springs on said rods, a power shaft, a transmission shaft and a knuckle joint connecting said shafts within said ball.

Signed at Montreal, Canada, this 27th day of December, 1921.

ALPHONSE JOSEPH LAVOIE.